United States Patent
Amthor et al.

(10) Patent No.: US 12,523,857 B2
(45) Date of Patent: Jan. 13, 2026

(54) MICROSCOPY SYSTEM AND METHOD FOR DETERMINING AN ORIENTATION OF A SAMPLE CARRIER

(71) Applicant: Carl Zeiss Microscopy GmbH, Jena (DE)

(72) Inventors: Manuel Amthor, Jena (DE); Daniel Haase, Zoellnitz (DE)

(73) Assignee: Carl Zeiss Microscopy GmbH, Jena (DE)

( * ) Notice: Subject to any disclaimer, the term of this patent is extended or adjusted under 35 U.S.C. 154(b) by 386 days.

(21) Appl. No.: 18/120,597

(22) Filed: Mar. 13, 2023

(65) Prior Publication Data

US 2023/0296875 A1    Sep. 21, 2023

(30) Foreign Application Priority Data

Mar. 18, 2022   (DE) .................... 10 2022 106 435.2

(51) Int. Cl.
*G02B 21/36* (2006.01)
*G06T 7/11* (2017.01)

(52) U.S. Cl.
CPC ............. *G02B 21/367* (2013.01); *G06T 7/11* (2017.01); *G06T 2207/10056* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 6,327,381 | B1* | 12/2001 | Rogina | H04N 13/167 348/E13.071 |
| 10,132,761 | B2* | 11/2018 | Aoyama | G01N 23/046 |
| 2009/0129543 | A1* | 5/2009 | Le Gros | G21K 7/00 359/393 |
| 2010/0194873 | A1* | 8/2010 | Viereck | G02B 21/367 348/79 |
| 2020/0088984 | A1 | 3/2020 | Haase et al. | |
| 2020/0371335 | A1 | 11/2020 | Amthor et al. | |
| 2021/0088770 | A1* | 3/2021 | Flanagan | G06N 3/08 |
| 2021/0225026 | A1* | 7/2021 | Amthor | G06T 7/80 |

(Continued)

FOREIGN PATENT DOCUMENTS

| | | |
|---|---|---|
| DE | 10 2017 111 718 A1 | 12/2018 |
| DE | 10 2019 113 540 A1 | 11/2020 |
| DE | 10 2020 101 191 A1 | 7/2021 |

(Continued)

OTHER PUBLICATIONS

Search Report for German Application No. 10 2022 106 435.2, Sep. 14, 2022, 7 pages (no English translation available).

*Primary Examiner* — Daniel T Tekle
(74) *Attorney, Agent, or Firm* — LaBatt, LLC (57) ABSTRACT

In a computer-implemented method for determining an orientation of a sample carrier of a microscope, an overview image showing at least a part of a sample carrier with a plurality of sample regions is received. The overview image is evaluated in order to localize predetermined structures. At least one image region that shows at least one predetermined structure is analyzed in order to calculate an orientation indication that discriminates between orientations of the sample carrier that are rotated by 180° relative to each other.

20 Claims, 4 Drawing Sheets

(56) References Cited

U.S. PATENT DOCUMENTS

2022/0114732 A1* 4/2022 Amthor .................. G02B 21/26
2023/0296875 A1* 9/2023 Amthor ..................... G06T 7/11
                                                              348/79

FOREIGN PATENT DOCUMENTS

DE    10 2020 123 562 A1   3/2022
DE    10 2020 126 602 A1   4/2022

* cited by examiner

MICROSCOPY SYSTEM AND METHOD FOR DETERMINING AN ORIENTATION OF A SAMPLE CARRIER

REFERENCE TO RELATED APPLICATIONS

The current application claims the benefit of German Patent Application No. 10 2022 106 435.2, filed on 18 Mar. 2022, which is hereby incorporated by reference.

FIELD OF THE DISCLOSURE

The present disclosure relates to a microscopy system and a method for determining an orientation of a sample carrier of a microscope.

BACKGROUND OF THE DISCLOSURE

Modern microscopes frequently include an overview camera which is mounted on the microscope stand and which can capture an overview image of a sample carrier. The overview camera is provided in addition to the actual system camera (microscope camera), which captures an image at a higher magnification via a microscope objective. Overview images are playing an increasingly important role in the automation of workflows and improvement of navigation. For example, in a semi-automated sample navigation, a microscope user specifies by means of an overview image which of a plurality of sample regions is to be positioned in the field of view of the microscope camera by a motorized sample stage of the microscope.

A sample carrier can be, for example, a microtiter plate with a plurality of wells/sample receptacles. An automation or navigation generally involves a localization of sample receptacles in the overview image, e.g., using machine-learned image segmentation methods. A designation is assigned in a software to each localized sample receptacle, for example an indication of the column and row of the sample receptacle such as "A5" or "C3". Designations are generally also provided for the sample receptacles on the sample carrier itself; for example, each column and row of sample receptacles can be labelled in the manner "A, B, C . . . " and "1, 2, 3 . . . ", or individual sample receptacle designations can be respectively provided next to the associated sample receptacles. A designation assigned in the software that does not match the designation on the sample carrier creates a risk of error. This risk arises in particular when a sample carrier can be arranged in different orientations on the sample stage or in a holding frame on the sample stage. For example, sample carriers can generally be positioned in orientations that are rotated by 180° relative to each other. Depending on these orientations which differ by 180°, a particular corner of the sample carrier is in particular either top left or bottom right in a captured overview image. Software conventionally does not discriminate between these orientations which differ by 180°. A designation of a particular sample receptacle consequently varies in overview images depending on the orientation in which the sample carrier is arranged on the sample stage. A well with the designation "A1" on the sample carrier can be assigned the designation "H12" by the software in the event of an incorrect orientation on the sample stage. The risk of confusing sample receptacles increases in cases where the designation of a sample receptacle in the software does not match the designation of the sample receptacle on the sample carrier.

This problem is particularly relevant in the context of long-term studies in which the same sample carrier is placed on a sample stage on a number of occasions that are spaced apart temporally. Should a user inadvertently choose a different orientation of the same sample carrier in the course of the series of measurements, the designations assigned by the software will be incorrect. The software erroneously assumes, for example, that a sample receptacle located at the top left in a preceding overview image and a sample receptacle located at the top left in subsequent overview images are identical. Measurements carried out in a long-term experiment with the sample carrier in different orientations thus yield incorrect results.

The orientation of the sample carrier should thus ideally be checked manually. However, if this manual check is forgotten or not performed correctly for measurements performed on different days of a long-term experiment, the measurement result will be falsified by the incorrect matching of the sample receptacles, which in the worst-case scenario goes unnoticed.

The issue described in the foregoing was established in preliminary research relating to the invention and does not necessarily represent published prior art. Reference is made to the following documents of the prior art as background to the invention: German patent application no. DE 10 2020 126 602 A1, filed Oct. 9, 2020, describes a machine-learned model for localizing sample wells of a microtiter plate. DE 10 2017 111 718 A1 describes the capture of at least two overview images with a different illumination. A structure of interest of a sample carrier is localized in these overview images, in particular a text or a cover slip on the sample carrier. The localized structure can be utilized for a rough positioning of the sample by means of a movable sample stage.

SUMMARY OF THE DISCLOSURE

It can be considered an object of the invention to indicate a microscopy system and a method which detect an incorrect orientation of a sample carrier in a reliable manner.

This object is achieved by means of the methods of the invention and by means of the microscopy system of the invention.

In a computer-implemented method according to the invention for determining an orientation of a sample carrier of a microscope, an overview image showing at least a part of a sample carrier with a plurality of sample regions is received. The overview image is evaluated in order to localize predetermined structures. At least one image region that shows at least one predetermined structure is analyzed in order to calculate an orientation indication that discriminates between orientations of the sample carrier that are rotated by 180° relative to each other.

A further computer-implemented method for determining an orientation of a sample carrier of a microscope can be based on an end-to-end learning process. In this method, an overview image showing at least a part of a sample carrier with a plurality of sample regions is received. The orientation of the sample carrier is established by means of a learned model, which is trained to calculate an orientation indication of the sample carrier from an input overview image, wherein the orientation indication discriminates between orientations that are rotated by 180° relative to each other.

A microscopy system according to the invention comprises a microscope for image capture and a computing device which is configured to carry out one of the computer-implemented methods according to the invention.

A computer program according to the invention comprises commands that, when the program is executed by a computer, cause said computer to execute one of the computer-implemented methods according to the invention.

In contrast to conventional image analysis results, the orientation indication discriminates at least between orientations of the sample carrier that are rotated by 180° relative to each other. The segmentation of a sample carrier or localization of sample carrier edges in the overview image in a known manner does not allow a distinction as to whether the sample carrier is rotated by 180°. This applies in particular to typical rectangular sample carriers or other sample carriers that have symmetrical outer edges and/or symmetrical arrangements of sample regions when rotated by 180° or mirrored. If, e.g., an orientation of a cover slip edge or sample carrier edge is established in the overview image in these cases, this does not provide any information as to which of two orientations rotated by 180° relative to each other currently applies to the sample carrier on the sample stage. In contrast, the orientation indication determined in accordance with the invention discriminates between these orientations of the sample carrier.

Orientation can be understood in the present disclosure as an orientation or rotation about an optical axis of the microscope. Orientations to be discriminated from each other lie in the same xy-plane when an objective views the sample carrier in the z-direction. Orientations of the sample carrier rotated by 180° relative to each other thus do not relate to cases where a sample carrier is turned upside down, i.e. to an inversion of its top and bottom sides.

Optional Embodiments

Variants of the microscopy system according to the invention and of the method according to the invention are the object of the dependent claims and are described in the following. To facilitate a better understanding of the invention, the terms "sample carrier" and "sample regions" will be explained first.

Sample regions of a sample carrier: Sample regions can generally be different, spatially separate regions of a sample carrier at which a sample to be analyzed can be located. The sample regions can be discrete sample chambers which are separated from one another by walls. Alternatively, sample regions can be separate regions without walls; for example, different sample regions can be created within a dish by different or spatially separate substrates or nutrient solutions.

Sample carrier: A sample carrier can be understood as a substrate which can accommodate or support respective samples to be analyzed at a plurality of respective different locations. For example, a sample carrier can be a multiwell plate (microtiter plate) which comprises sample regions in the form of a plurality of wells/sample receptacles. A sample carrier can also be a chamber slide which comprises sample regions in the form of a plurality of separate, in particular rectangular, sample receptacles. Slides, Petri dishes or other vessels can also be employed as sample carriers.

Exploiting the Orientation Indication for a Correct Assignment of Sample Regions The localized sample regions in the overview image can be assigned identifiers (e.g. numbers) of an identification system as a function of the calculated orientation indication of the sample carrier. The numeration can start, for example, with the smallest number either from the top left or bottom right in the overview image depending on the orientation indication. An identifier or number in this context can be understood as synonymous with a "sample region designation" and does not have to be restricted to numbers. Rather, any characters that express a sequence can be used as identifiers, in particular letters (A, B, C . . . ) or combinations of numbers and letters (A1, A2, . . . , A1, B1, . . . ) when sample regions are arrayed in rows and columns on the sample carrier.

The orientation indication can indicate whether the orientation of the sample carrier is a correct orientation or an incorrect orientation, i.e. rotated by (in particular) 180° relative to the correct orientation. The determination of the orientation indication can thus occur by means of a classification into one of two possible classes describing the orientations rotated by 180° relative to each other. Minor variations in orientation thus do not change the classification into either a correct or incorrect orientation. Instead of two classes, it is also possible to provide four possible classes which correspond to orientations respectively rotated by 90° relative to each other. The orientation indication thereby discriminates between these four orientations alone and does not depend on a minor variation in the positioning on the microscope stage.

The correct orientation can designate, e.g., an orientation of the sample carrier in which the sample carrier is arranged on a sample stage of the microscope in such a manner that numbers or letters (e.g. column/row markers of sample receptacles) on the sample carrier are not upside down when viewed by a user in front of the microscope. The incorrect orientation, on the other hand, can designate an orientation in which numbers or letters on the sample carrier are upside down when viewed by a user in front of the microscope, i.e. are rotated by 180° relative to the correct orientation. Orientations rotated by 90° can optionally also be classified as incorrect orientations.

Alternatively, the correct orientation can designate an orientation of the sample carrier in which an orientational feature of the sample carrier is located at an associated orientational feature of a holding frame on the sample stage. These orientational features can be constituted by, e.g., a beveled corner. A beveled corner of the sample carrier should thus be arranged at a beveled corner of the holding frame while other corners of the sample carrier which form a 90° angle without a bevel should fit against correspondingly shaped 90° corners of the holding frame. The incorrect orientation in this case can designate an orientation in which the orientational feature of the sample carrier is not located at the corresponding orientational feature of the holding frame on the sample stage.

In cases where the orientation indication indicates a correct orientation, localized sample regions in the overview image can be provided with identifiers (sample region designations) according to a first sequence. In cases where the orientation indication indicates an incorrect orientation, on the other hand, the localized sample regions in the overview image can be provided with identifiers according to a second sequence, wherein the second sequence is the inversion of the first sequence. The first sequence can be, e.g., an ascending number sequence that starts with the sample receptacle that is uppermost and furthest to the left in the overview image. This sample receptacle can receive the designation "A1". The further a sample receptacle is located to the right and/or lower down in the overview image, the further the designation progresses in the sequence (respectively to larger numbers and further letters of the alphabet from A to Z). The second sequence in this example, on the other hand, is a descending number sequence that starts from the sample receptacle that is uppermost and furthest to the left in the overview image or, in other words, an ascending number sequence that starts from the sample receptacle that is lowermost and furthest to the right in the overview image.

An orientation indication can optionally also discriminate between more than two orientations that are rotated by 180° relative to each other. With rectangular and in particular square sample carriers, it can also occur that a user places a sample carrier on a sample stage in an orientation that is rotated by 90° or 270° relative to a correct orientation. If a particular corner of the sample carrier should be located, for example, at the top left of the overview image in the correct orientation, this corner can be top right, bottom left or bottom right in the overview image depending on the actual orientation. The orientation indication can thus additionally discriminate between a correct orientation and incorrect orientations that are rotated by +/−90° relative to the correct orientation.

The calculated orientation indication can be exploited for a navigation map. In order to form a navigation map, sample regions are first determined in the overview image, e.g. by segmentation with a machine-learned segmentation model. A navigation map is generated based on the overview image, wherein localized sample regions are marked on the navigation map. The localized sample regions in the navigation map are also provided with the identifiers described above. Sample regions can be selected in the navigation map by a user, whereupon a sample stage of the microscope moves so that an optical axis of the microscope runs through a selected sample region. It is optionally also possible for a selection of a particular sample region to occur through entry of the assigned identifier, e.g. by entering "C4", whereupon the sample receptacle C4 is positioned in the path of the optical axis. Thanks to the calculated orientation indication, this designation matches the actual designation on the sample receptacle.

An identifier of a sample region can also be exploited to adjust (default) position settings of a sample stage as a function of the calculated orientation indication. For example, a default position setting of the sample stage can be chosen for a workflow so as to allow the analysis of a sample region in a particular corner of the sample carrier. The calculated orientation indication makes it possible to discriminate between the four sample regions located at the four corners of a rectangular sample carrier. The orientation indication and the sample region identifiers derived from the same can thus be exploited to adjust the position settings of the microscope stage so as to allow the analysis of the desired sample region at a particular corner of the sample carrier in the workflow.

Predetermined Structures

The orientation of the sample carrier is established using predetermined structures. Predetermined structures are intended to be understood as structures or objects of a specified type on the sample carrier (e.g. an image logo of a manufacturer of the sample carrier). If such a type is established in the overview image, for example if an image logo of the manufacturer is found in the overview image, the orientation of the sample carrier can be inferred from the orientation and/or position of this structure within the overview image. "Orientation" is intended to be understood here as a rotational position while "position" indicates a location within the overview image. A position of a structure can provide important information, for example, when a circle constituting a predetermined structure is invariably found at a designated corner of a sample carrier type. By establishing the position of the circle in the overview image, the designated corner can be identified and discriminated from the other corners of the sample carrier. An orientation generally provides important information when the predetermined structure is not rotationally invariant or rotationally symmetric.

For example, the predetermined structures can include one or more of the following:

Sample region designations that are, e.g., stamped into or imprinted on the sample carrier. For example, it is possible to exploit a designation of a sample well such as "A1, A2, . . . " or a row/column designation "A, B, C . . . ; 1, 2, 3 . . . " of sample wells. With transparent sample carriers, a designation can also be visible on a reverse side that faces away from the overview camera. Designations on the reverse side can appear mirror-inverted to the overview camera.

Light reflections on a surface of the sample carrier. Depending on the sample carrier type, certain light reflections occur at specific locations on the sample carrier or in specific forms so that a position or orientation of the light reflections can indicate the orientation of the sample carrier.

Adhesive labels or stamped markings. These can include, for example, text, symbols, bar codes or image logos.

Shapes of sample carrier sections. For example, the corners of a sample carrier can be shaped differently, at least one corner being beveled/truncated and at least one corner not beveled so that the orientation of the sample carrier can be deduced from one or more corners in the overview image. Specially shaped sample carrier sections can also be ridges or undulating edges so that a position and/or orientation of at least one ridge or undulating edge can be exploited to calculate the orientation of the sample carrier.

Sample receptacles or a lateral offset of sample receptacles. A lateral offset can designate a distance of sample receptacles from the edge of the sample carrier or from the edge of the overview image. In some types of sample carriers, the distances between a sample carrier edge and adjacent sample receptacles are different. Depending on the orientation of the sample carrier in a holding frame on the sample stage, the different distances thus bring about an offset that can be established in the overview image. The sample receptacles themselves can also provide information regarding the orientation of the sample carrier, depending on the sample carrier type, e.g. when the sample receptacles have different shapes, edges or are arranged in an irregular fashion.

A software or computing device for localizing predetermined structures can be configured to search for a plurality of said predetermined structures in an overview image. This increases the probability that the overview image contains at least one predetermined structure and that such a predetermined structure can be localized. In cases where a plurality of predetermined structures of different types are localized (e.g., stamped markings and light reflections), it is optionally possible to determine which of the predetermined structures is to be utilized for the orientation determination based on a predefined sequence. For example, stamped markings may allow a more reliable orientation determination than light reflections so that the light reflections are only analyzed when no stamped markings are found in the overview image. Alternatively, different weightings can be used for different types of predetermined structures. This way, an image region of a light reflection, for example, can also contribute to the calculation of the orientation indication, but with a smaller weighting than the image region of the stamped markings. Depending on the type of predetermined structures, the weightings can be predefined so as to be fixed or can be defined variably by means of a confidence score. The confidence score can relate to the reliability of an orientation estimate for the respective image region of a localized predetermined structure, which is described in more detail later on.

Localization of Image Regions that Serve to Establish the Orientation

The localization of image regions that serve to establish the orientation can occur by means of image analysis of the overview image. It is in principle also possible for the image regions to have been determined beforehand based on other images or for the image regions to be predetermined by means of predefined pixel coordinates independently of the specific image content of an overview image. This can be feasible, e.g., when it is known in which image section a corner of the sample carrier is located so that an orientation of the sample carrier can subsequently be deduced from the shape of the corner.

The localization of image regions in the overview image is preferably carried out by a machine-learned model, e.g. a neural network. The model can also be called a localization model and can be trained in particular for semantic segmentation, instance segmentation or detection. In the training of such a model, overview images can be provided as input images, wherein the desired result is provided in the form of a target result, e.g. a segmentation mask or image coordinates of a frame ("bounding box") that frames a predetermined structure, for at least some of the overview images. The predetermined target results thus define the image content that constitutes a predetermined structure. For example, frames around structures can be marked manually or (semi-)automatically in overview images of the training data, whereby such structures constitute "predetermined structures" upon completion of the training.

Analyzing Image Regions to Establish the Orientation

The analysis of one or more image regions respectively showing at least one predetermined structure occurs by means of image analysis software, preferably by means of a machine-learned image processing model. The image processing model can have been learned using training data comprising input data in the form of image regions with predetermined structures for which an orientation indication is respectively specified in the form of a target result. The image processing model can comprise, e.g., at least one classifier that categorizes an input image region into one of a plurality of classes. The classes can designate two orientations of the sample carrier that are rotated by 180° relative to each other. It is also possible to assign the designation "correct orientation" to one of these orientations and the designation "incorrect orientation" to the other. It is also possible to provide further classes such as, for example, a total of four classes designating orientations of the sample carrier that are respectively rotated by 90° relative to each other. Input images used in the training can accordingly be image regions of sample carriers whose orientation corresponds to the designated class. The image regions of the training thus show predetermined structures in different orientations, in particular in orientations rotated by 180° relative to each other. In the inference phase, upon completion of the training, the model can calculate an orientation indication/orientation estimate from any input image region.

In a variation, a classification is carried out with a regression model instead of at least one classifier. An output of the regression model constitutes a classification with an associated confidence score. The confidence score is a measure of the certainty that the classification is correct. If, for example, an orientation is established based on a text that is very indistinct, then the confidence score is generally lower than in a case where the text is clearly legible.

In the foregoing description, exclusively image regions of the relevant structures are analyzed. It is alternatively also possible, however, for larger image sections to be analyzed in the described manner. For example, the image section that shows the sample carrier can be established in the overview image in a first step. This image section can contain a plurality of the described predetermined structures and can be analyzed on the whole as described above.

Instead of or in addition to the orientation of a localized predetermined structure, it is also possible for its position to indicate the orientation of the sample carrier. Position can be understood as image coordinates in the overview image or as a relative position in relation to other parts of the sample carrier, in particular in relation to edges of the sample carrier. For example, a particular object, such as an adhesive label or a particular marking, can always be provided at a particular corner of a sample carrier type. If this object is localized, the corner of the sample carrier can be discriminated from other corners of the sample carrier so that it is possible to calculate an orientation indication. In a specific implementation, information regarding the location and optionally the type of a predetermined structure can be input after the localization of the relevant structure into a machine-learned model, which calculates an orientation indication for the sample carrier based on the input data. Optionally, the entire overview image can also be input into the model together with the aforementioned information.

The terms "orientation indication" and "orientation estimate" can synonymously indicate a calculated orientation of the sample carrier. To render the difference between these terms clearer, the term "orientation estimate" is used in the following for a single estimate relating to a single image region among a plurality of image regions. Orientations can accordingly be respectively estimated for a plurality of image regions, wherein these orientation estimates are subsequently combined into an overall result. The overall result constitutes the orientation indication. A formulation such as "determining an orientation" of the sample carrier can be understood as synonymous with "calculating an orientation indication".

In different variant embodiments, a respective orientation estimate is calculated for each of a plurality of image regions which respectively show a predetermined structure. Optionally, an associated confidence score is established for each orientation estimate. For example, with machine-learned models, in particular regression models, a confidence score for the calculated orientation estimate can be output directly. The orientation estimates are subsequently combined in order to calculate the orientation indication. This can occur while taking into account the associated confidence scores, e.g., by disregarding the orientation estimates with the lowest confidence score or by filtering out outliers in the orientation estimates. Alternatively, confidence scores can be used for weightings of the orientation estimates. A model-based combination of the orientation estimates is also possible, for example by means of logistic regression, wherein confidence scores can optionally be taken into account.

Overview Image and Optional Additional Images for Determining the Orientation

The overview image can be a macroscopic overview image captured by a separate overview camera on the microscope stand. It is in principle also possible, however, for the overview image to be a microscope image captured via a microscope objective and the microscope camera, provided that a section of the sample carrier—as opposed to the sample alone—is visible in the microscope image.

Descriptions relating to the overview image are generally intended to be understood in the sense of "at least one overview image". Additional overview images can be incorporated in the calculation of the orientation indication. For example, it is possible to use a plurality of overview images from different viewing directions. A plurality of overview images can be captured with different settings, e.g. different lighting or camera settings, using the same overview camera. Alternatively, the sample stage can also be moved between the capture of a plurality of overview images. It is also possible to use different overview cameras. In principle, images captured using reflected and/or transmitted light are feasible. It is also possible to estimate a top view of the sample carrier and a bottom view of the sample carrier from a plurality of raw overview images captured in an oblique viewing direction. One or more orientation estimates can be calculated from each overview image, which are then combined in a common decision.

Use of Different Images for Localization and Orientation Determination

Localizing a predetermined structure and determining the orientation using the localized structure can occur either based on the same overview image or based on different images.

For example, the overview image can first be captured with an overview camera. Following the localization of at least one predetermined structure, a sample stage is adjusted so that at least one of the predetermined structures is located in a field of view of a microscope camera. The microscope camera is different from the overview camera. Following the adjustment of the sample stage, at least one microscope image of the localized predetermined structures is captured with the microscope camera. The microscope image or a section of the same is used as the image region by means of which the orientation indication is calculated. This approach is particularly suitable when the predetermined structures are not visible in the overview image with a sufficient image quality, for example in the case of a predetermined structure in the form of text with a very small font.

In a variation of the foregoing embodiment, both the overview image and the microscope image are captured by the microscope camera, wherein the objective used for capturing the overview image has a lower magnification than the objective used for capturing the microscope image.

End-to-End Model

A model (end-to-end model) can be trained to calculate an orientation indication of the sample carrier directly from an input overview image. The end-to-end model can thus receive the entire overview image as input based on which it outputs the evaluated orientation. Explicit intermediate steps in which predetermined structures are established or image regions of the predetermined structures are selected are not provided.

The training data of the end-to-end model can in particular comprise input data in the form of overview images showing sample carriers in orientations rotated by 180° relative to each other. A known orientation indication is specified in the training for at least some of these overview images. A model is thus learned that is able to estimate an orientation indication directly from an input overview image.

The optional features described in the foregoing can also be used with the end-to-end model. Variants according to which an image region is entered into the model can be altered for the end-to-end model so that the entire overview image is entered instead of the image region.

Contextual Information

In addition to the image content of an overview image and optional additional images, it is also possible to incorporate contextual information in the calculation of the orientation indication. Contextual information can be exploited by the end-to-end model or the image processing model so that an orientation estimate/orientation indication is also calculated as a function of input contextual information. Contextual information can also be exploited by a localization model that evaluates the overview image in order to localize predetermined structures. The localization thus occurs as a function of input contextual information.

Contextual information can in particular relate to one or more of the following: a microscope user; settings or components of the microscope; a holding frame used to hold the sample carrier; a model type of the sample carrier; and/or properties of the sample carrier.

Specified contextual information can be exploited in the training together with input image data (e.g. overview image and/or image regions) and the associated target data (e.g. image coordinates of predetermined structures or in the form of orientation indications specified as "ground truth").

Settings or components of the microscope can relate, e.g., to: an illumination, image capture parameters, workflow settings, an objective in use, a contrast mode or a microscope type. These settings and components can influence the depiction of a sample carrier in the overview image and/or a probability of different sample carrier types being used in the measurement operations. The probability with which different sample carrier types are used can also vary as a function of the microscope user. Contextual information can also relate to the model type of the sample carrier, wherein the model type indicates in particular a precise make or model line, e.g., of a particular manufacturer. Properties of the sample carrier specified as contextual information can relate, e.g., to a number, arrangement or shape of the wells/sample regions, or to a color of the sample carrier. Information regarding a holding frame in use is helpful as contextual information inasmuch as it can depend on the holding frame how the depictions of orientations of a sample carrier that are rotated by 180° relative to each other differ in the overview image.

General Features

The overview image can be an unprocessed raw image, in particular captured by the overview camera. Alternatively, it is also possible for the overview image to be generated from one or more raw images, for example by cropping a raw image, by modifying image properties such as brightness, contrast or tonal values, by combining a plurality of raw images of different image brightnesses or by joining together overlapping raw overview images (image stitching).

The overview camera can be arranged on a microscope stand. If the microscope in question is a light microscope, then the overview camera is provided in addition to a microscope camera, which captures microscope images at a higher magnification than the overview camera. In principle, it is also possible for microscope images to be generated by other types of microscopes, for example by electron microscopes, X-ray microscopes or atomic force microscopes. A microscopy system denotes an apparatus which comprises at least one computing device and a microscope.

The computing device can be designed in a decentralized manner, be physically part of the microscope or be arranged separately in the vicinity of the microscope or at a location at any distance from the microscope. It can generally be formed by any combination of electronics and software and can comprise in particular a computer, a server, a cloud-based computing system or one or more microprocessors or graphics processors. The computing device can also be configured to control microscope components.

Method variants can optionally comprise the capture of at least one overview image by the microscope while in other method variants an existing overview image is loaded from a memory.

Descriptions in the singular are intended to cover the variants "exactly 1" as well as "at least one".

Described image processing or analyses can be carried out by means of software, in particular partially or completely by means of machine-learned models executed by the computing device.

Learned models generally denote models that have been learned by a learning algorithm using training data. The models can comprise, for example, one or more convolutional neural networks (CNNs), although other deep neural network model architectures are also possible. The models receive input in the form of image data, e.g., the overview image or sections of the latter, in particular the image regions. A learning algorithm uses training data to define model parameters of the machine learning model. A predetermined objective function can be optimized to this end, e.g. a loss function can be minimized. The model parameter values are modified to minimize the loss function, which can be calculated, e.g., by gradient descent and backpropagation.

The characteristics of the invention that have been described as additional apparatus features also yield, when implemented as intended, variants of the method according to the invention. Conversely, a microscopy system or in particular the computing device can also be configured to carry out the described method variants.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components.

DETAILED DESCRIPTION OF EMBODIMENTS

Different example embodiments are described in the following with reference to the figures.

FIG. 1

Figure 1:
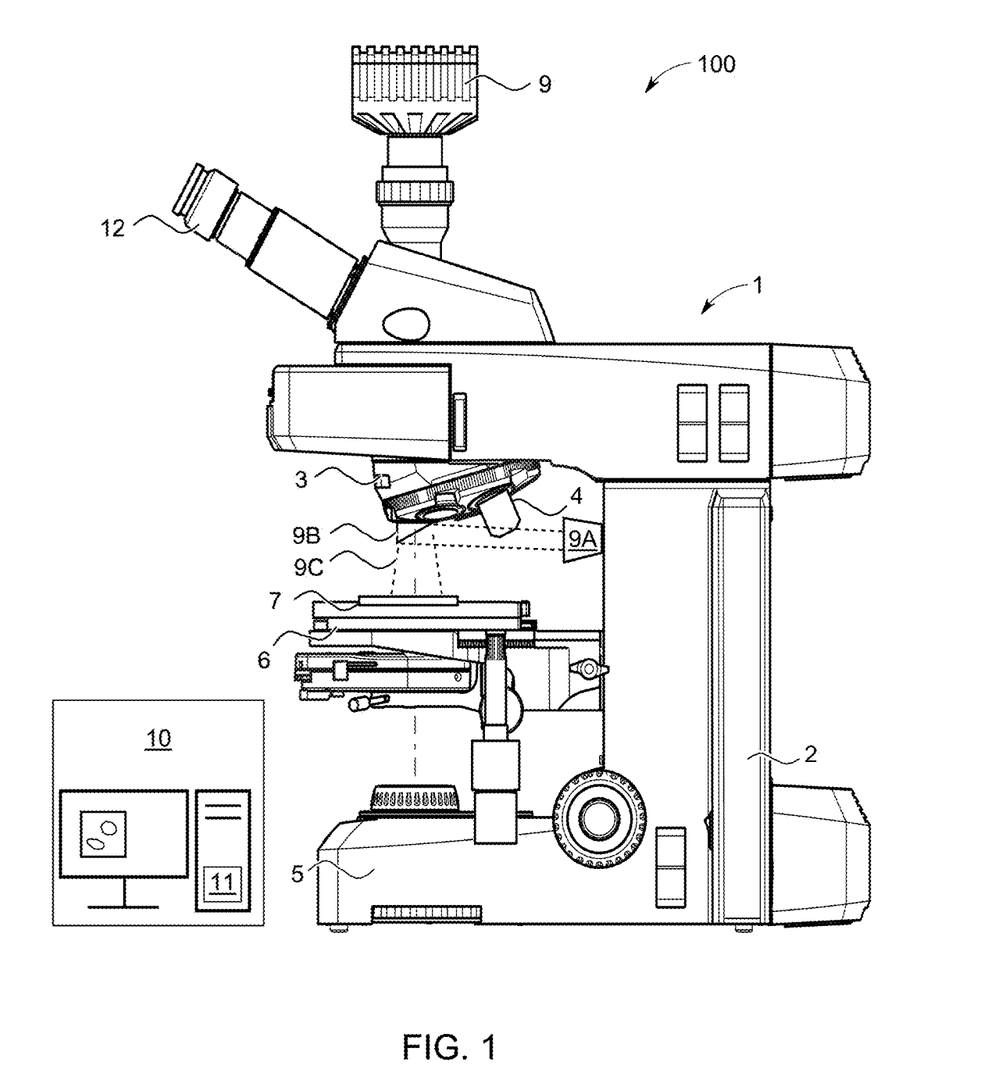
FIG. 1 schematically shows an example embodiment of a microscopy system of the invention.

FIG. 1 shows an example embodiment of a microscopy system 100 according to the invention. The microscopy system 100 comprises a computing device 10 and a microscope 1, which is a light microscope in the illustrated example, but which in principle can be any type of microscope. The microscope 1 comprises a stand 2 via which further microscope components are supported. The latter can in particular include: an illumination device 5; an objective changer/revolver 3, on which an objective 4 is mounted in the illustrated example; a sample stage 6 with a holding frame for holding a sample carrier 7; and a microscope camera 9. When the objective 4 is pivoted into the light path of the microscope, the microscope camera 9 receives detection light from an area in which a sample can be located in order to capture a microscope image. A sample can be to be any object, fluid or structure. In addition to or instead of the microscope camera 9, it is also possible to use an eyepiece 12. The microscope 1 optionally comprises an additional overview camera 9A for capturing an overview image of a sample carrier 7. A field of view 9C of the overview camera 9A is larger than a field of view of the microscope camera 9. In the illustrated example, the overview camera 9A views the sample carrier 7 via a mirror 9B. The mirror 9B is arranged on the objective revolver 3 and can be selected instead of the objective 4. In variants of this embodiment, the mirror is omitted or a different arrangement of the mirror or some other deflecting element is provided.

In the example shown, the overview camera 9A views the sample stage 6 from above and thus views a top side of a sample carrier 7 arranged there. Alternatively, the overview camera 9A can also be arranged so as to view the sample stage 6 from below so that it views a bottom side of a sample carrier 7 placed there. In the example shown, the microscope camera 9 views the sample carrier 7 from above, although it is alternatively also possible for it to view the sample carrier 7 from below in an inverted arrangement. The microscope camera 9 and the overview camera 9A can in particular also point at the sample carrier 7 from different sides. It is also possible to designate an image captured by the microscope camera 9 as an overview image, in particular when an objective with a low magnification is used.

The computing device 10 comprises a computer program 11 for determining an orientation of a sample carrier. This is discussed in greater detail in the following with reference to the following figures.

FIG. 2

Figure 2:
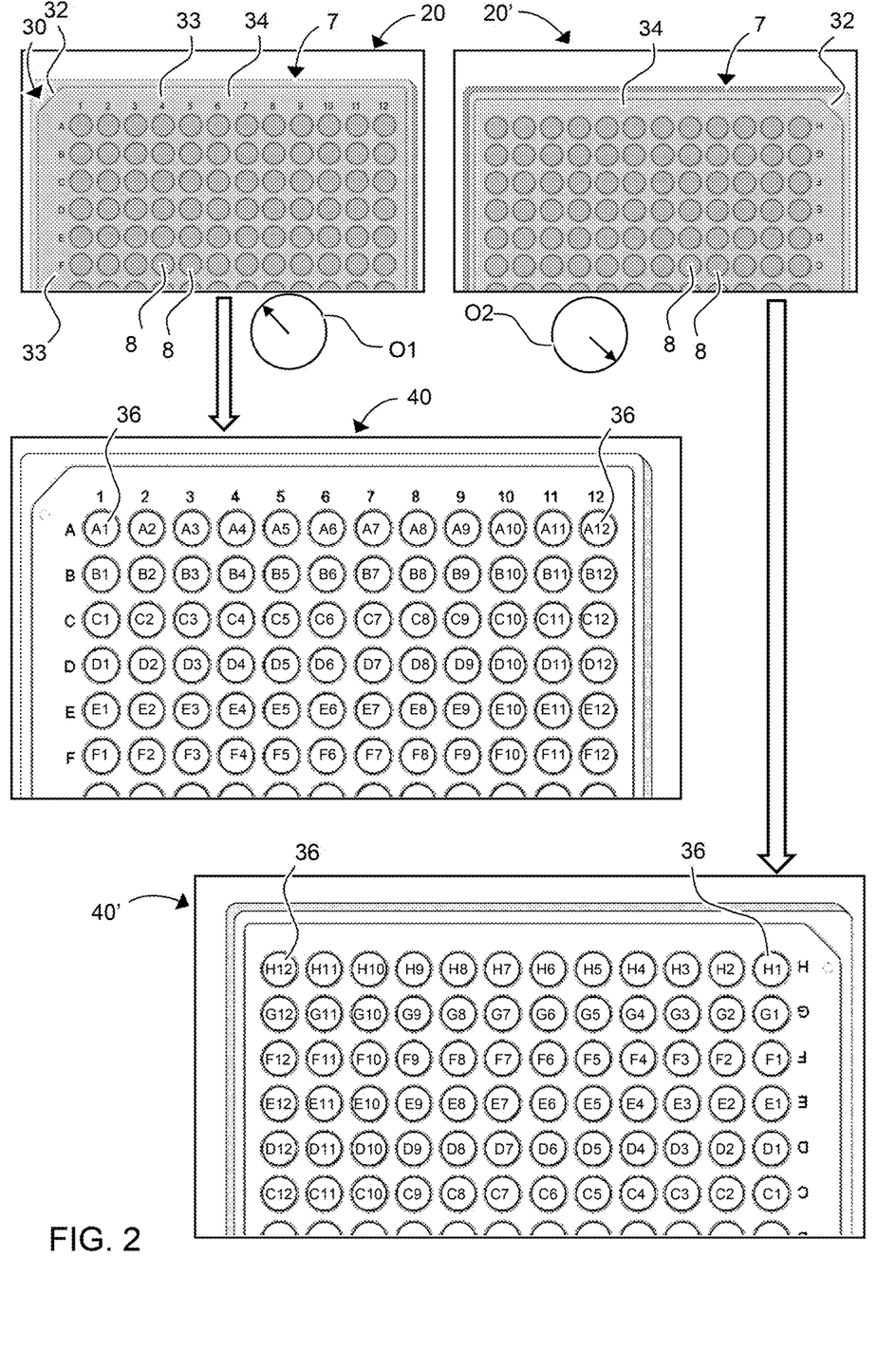
FIG. 2 schematically shows processes of an example embodiment of a method according to the invention.

FIG. 2 schematically illustrates processes of a method according to the invention that is executable by the computing device or computer program of FIG. 1.

FIG. 2 initially shows an overview image 20 of a sample carrier 7 or rather of a section of the sample carrier 7. The sample carrier 7 exhibits a plurality of sample regions 8 in which samples that are to be analyzed separately from one another can be arranged. In the illustrated case, the sample carrier 7 is a microtiter plate whose wells, which form the sample regions 8 here, are arranged in columns and rows. Other sample carriers 7 with a plurality of sample regions 8 can also be used, however. In the example shown, the sample carrier 7 includes row/column markers 33 by means of which the individual sample regions 8 are identified. The row/column markers 33 can indicate, e.g., columns by numbers "1, 2, 3, ..." and rows by letters "A, B, C, ...". The sample carrier 7 also comprises two beveled corners as orientational features 32, one of which is visible in the overview image 20. This corner is meant to be positioned at a corresponding beveled corner of a holding frame on the sample stage. This is the case in the example of the overview image 20 so that this orientation of the sample carrier 7 is designated as the correct orientation O1.

In principle, there is a risk that a user inadvertently positions the sample carrier 7 in an incorrect orientation on the sample stage so that, for example, the orientational feature 32 (i.e. the beveled corner) does not coincide with a corresponding orientational feature of the holding frame. This case is shown as the overview image 20'. The same sample carrier 7 is illustrated, yet in an incorrect orientation O2 in which the sample carrier 7 is rotated by 180° compared to the orientation O1. The rotation is to be understood as occurring about a substantially central axis perpendicular to the sample stage.

The overview image 20 or 20' is subsequently processed automatically. In particular, sample regions 8 are localized, which can occur by means of a machine-learned segmentation model. The sample regions 8 in the overview image are additionally ideally provided with designations or identifiers. FIG. 2 shows an overview image 40 processed accordingly, which is calculated from the overview image 20 and which can act as a navigation map. The sample regions 8 have been localized by instance segmentation and assigned an individual designation/identifier 36. The designations start with "A1" for the sample region in a corner at the top left of the sample carrier 7 in the overview image. Starting from this sample region "A1", there is an ascending sequence of identifiers 36 of the sample regions 8, i.e. the number for indicating the column increases to the right and the letter for indicating the row advances in the alphabet with each additional row localized in a downward direction in the overview image. As shown in FIG. 2, the identifiers 36 added in the processed overview image 40 match the designations provided on the sample carrier 7 (i.e. the column/row markers 33). A user can select a sample region 8 for analysis in the navigation map, for example, by clicking on a sample region 8 or by entering one of the displayed identifiers 36. A microscope stage is then automatically adjusted so that an optical axis of the microscope passes through the selected sample region 8.

If the overview image 20' is processed analogously, i.e. if the sample regions 8 are individually localized by instance segmentation and provided with identifiers, the processed overview image 40' is obtained, which can also act as a navigation map. According to the invention, the incorrect orientation O2 of the sample carrier 7 is taken into account. If the assignment of the identifiers 36 in the processed overview images 40, 40' had been determined independently of the orientation of the sample carrier 7, there would be a conflict between the identifiers 36 in the overview image 40' and the column/row markers 33 on the sample carrier 7. This conflict would in fact be attributable to the incorrect orientation O2, since the sample region 8 identified as "A1" according to the column/row markers 33 is not located at the top left in the overview image 20' or in the processed overview image 40'. Instead, the sample region with the maximum identifier value according to the column/row markers 33, in this example "H12", is located at this position.

According to the invention, an orientation of the sample carrier 7 is detected by image processing, i.e. there occurs a classification as to whether there is a correct orientation O1 or an incorrect orientation O2 rotated by 180° in relation to the correct orientation O1. Depending on the orientation detected, a sequence is chosen in which identifiers are assigned to the sample regions 8 in the processed overview image 40 or 40'. In general terms, the sequence described for the processed overview image 40 can be understood as an example of a first sequence while a second identifier sequence inverse to the first is chosen in the overview image 40'. This ensures or at least increases the probability that the designations indicated in the processed overview image 40, 40' correspond to designations located on the sample carrier 7. The described approach offers advantages, however, even when the sample carrier 7 does not include any designations: for example, it is ideally ensured that, when a sample carrier 7 is repeatedly placed on the sample stage, a particular sample region is not confused with other sample regions even if the sample carrier 7 is inadvertently placed in a different orientation. Identifiers 36 assigned to the sample regions 8 must accordingly be chosen while taking into account the orientation of the sample carrier 7.

The detection of the orientation can occur based on one or more predetermined structures 30. A predetermined structure 30 is understood in the sense that a software used for image analysis is designed to find a particular type of structure in images. In principle, the type of structure can include any objects or features of the sample carrier 7 whose depiction in the overview image depends on the orientation of the sample carrier 7. For example, beveled corners (orientational features 32) of sample carriers 7 can be localized as predetermined structures 30. The orientation of the sample carrier 7 can be deduced from a position and/or orientation of this predetermined structure 30 in the overview image 20, 20'.

An image processing software can also search for a predetermined structure 30 in the form of column/row markers 33. If the numbers or letters of the column/row markers 33 can be detected, their orientation can be used to deduce the orientation of the sample carrier 7 directly. In cases where the image quality of the overview image 20, 20' is poor, it can occur that a column/row marker 33 is localized while individual numbers or letters of the column/row marker 33 cannot be identified with certainty. In this case, a position of the column/row marker 33 allows an inference to be drawn regarding the orientation of the sample carrier 7. For example, for the sample carrier 7 shown in FIG. 2 with a correct orientation O1, a column/row marker 33 is expected to be located in an area 34 of the sample carrier 7, the area 34 lying between an upper edge of the sample carrier 7 in the overview image and the uppermost row of sample regions 8. In the case of an incorrect orientation O2, on the other hand, there are no column/row markers 33 in the area 34, as illustrated in the overview image 20'. An orientation of the sample carrier 7 can thus be deduced from the presence of a column/row marker 33 (in more general terms: from a predetermined structure 30) in a particular area 34.

Further characteristics of the method according to the invention are described with reference to the following figure.

FIG. 3

Figure 3:
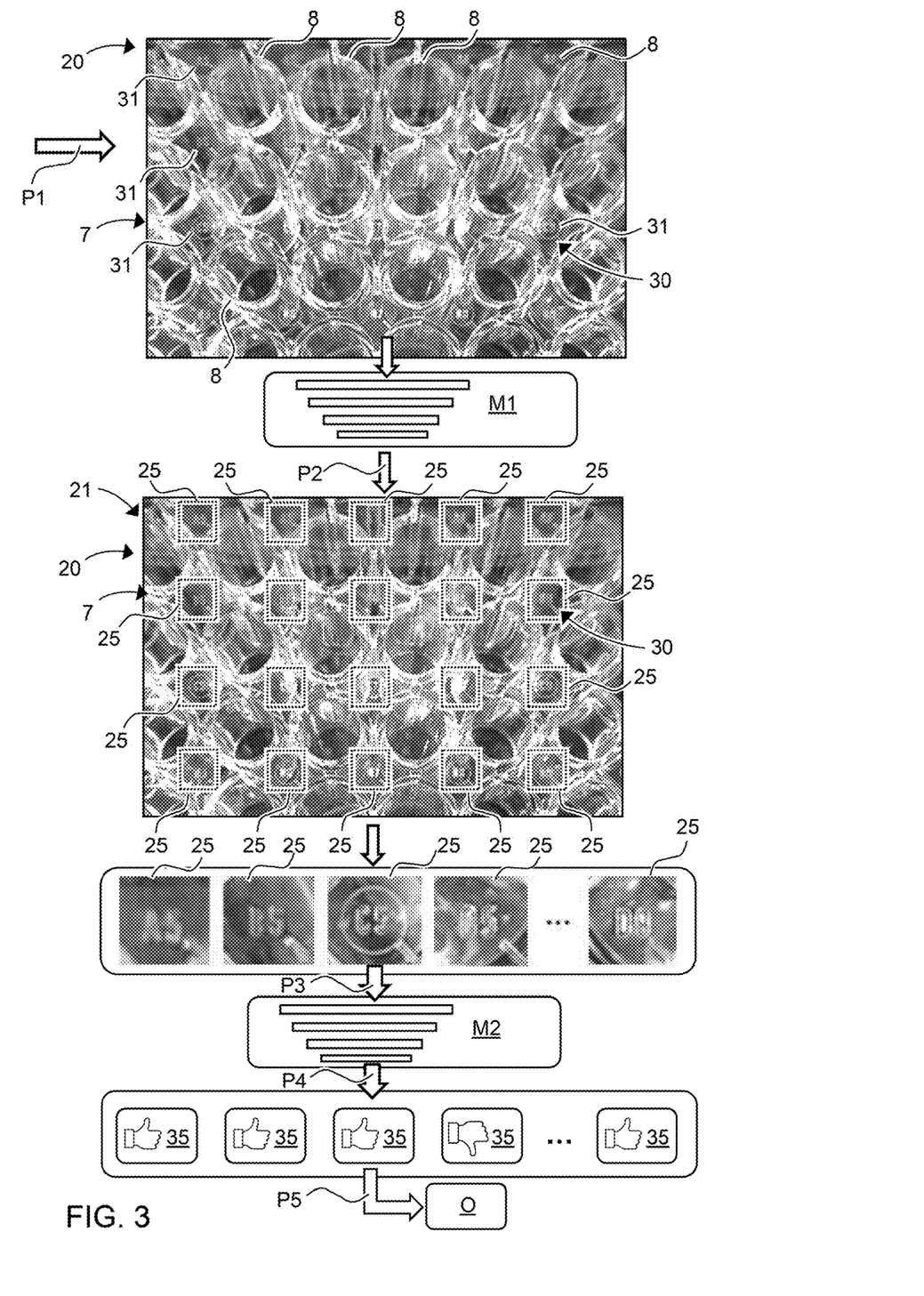
FIG. 3 schematically shows further processes of example embodiments of a method according to the invention.

FIG. 3 shows further processes of a method according to the invention. In process P1, an overview image 20 is received, e.g., loaded from a memory or captured by a microscope. The overview image 20 shown is an actual captured overview image. The overview image shows a part of a sample carrier 7 (a multiwell plate), which has a plurality of circular sample regions 8 (sample wells). Sample region designations 31 stamped into the sample carrier 7 between the sample regions 8 are to be exploited here as predetermined structures 30. In the present example, the sample region designations 31 are formed in the manner of "A1", "A2", etc. An orientation of the sample region designations 31 in the overview image 20 allows an inference to be drawn regarding the orientation of the sample carrier 7 on the microscope stage.

A machine-learned localization model M1 that has been trained using training data to localize predetermined structures 30 in an input image is implemented. The localization model M1 can be designed, e.g., as a detection model or segmentation model. The training data can comprise overview images for which image coordinates of the predetermined structures are indicated as predefined target results. For example, the locations of particular objects can be marked manually in overview images of the training data in order to provide the target results. In the present example, the localization model M1 detects the sample region designations 31 and indicates the corresponding image regions 25 (process P2). In general terms, predetermined structures 30 are localized in the overview image 20 in process P2. FIG. 3 illustrates this by a superimposition 21 of the overview image 20 with the bounding boxes of the image regions 25 calculated by the localization model M1. A predetermined structure 30, namely a sample region designation 31, was found in each image region 25. FIG. 3 shows a few of these image regions 25 in an enlarged view. The image regions 25 are input into a machine-learned image processing model M2. The machine-learned image processing model M2 has been trained using training data to calculate an orientation estimate or orientation indication. The training data can comprise image regions which respectively contain a predetermined structure. Different image regions show predetermined structures in (at least or exclusively) two different orientations that are rotated by 180° relative to each other. One of these orientations can be designated as the correct orientation and the other orientation can be designated as the incorrect orientation. A respective orientation indication is specified as a target result/ground truth for the image regions of the training data. Using this training data, the image processing model M2 learns to output an orientation estimate 35 from an input image region 25 in the inference phase. In FIG. 3, a plurality of image regions 25 are input into the image processing model M2 (process P3), which calculates respective orientation estimates 35 for the same (process P4). An orientation estimate 35 indicates based on the evaluation of an associated image region 25 whether there is a correct orientation of the sample carrier or an orientation that is rotated by 180° relative to the correct orientation. The orientation estimates 35 are combined in process P5 to form an overall result, which is called an orientation indication O. In process P5, it can be determined, e.g., which orientation was established with the greatest frequency among the orientation estimates 35. In the examples shown, more orientation estimates 35 indicate a correct orientation than an incorrect orientation so that a correct orientation of the sample carrier 7 is indicated as the orientation indication O. The orientation estimates 35 can also be combined in some other way to form an orientation indication O. It is also possible in variations for an image processing model M2 to be learned into which a variable number of image regions 25 is input and which calculates the orientation indication O directly therefrom, without explicitly outputting a plurality of orientation estimates 35.

The orientation indication O can be used as described with reference to FIG. 2 in order to assign designations to the sample regions 8 in the overview image 20 or in an image calculated from the latter. In a variation of this embodiment, designations for localized sample regions 8 are suggested based on the orientation indication and a user is provided with the option of reversing the sequence of the designations. Alternatively or additionally, the orientation indication O can also be used in some other way. For example, a warning can be issued to a user if an incorrect orientation of the sample carrier 7 is probable. Alternatively, predetermined positions of the microscope stage can be manipulated as a function of the calculated orientation specification O. For example, sample regions 8 that are to be successively analyzed or position settings of the microscope stage that are to be successively implemented can be specified in a workflow. These settings relate to a particular (i.e. the correct) orientation of the sample carrier 7. In cases where a different/incorrect orientation is detected, a particular sample region 8 is in a correspondingly different location so that the predetermined position settings of the microscope stage can be adjusted accordingly by means of the calculated orientation indication O.

Figure 4:
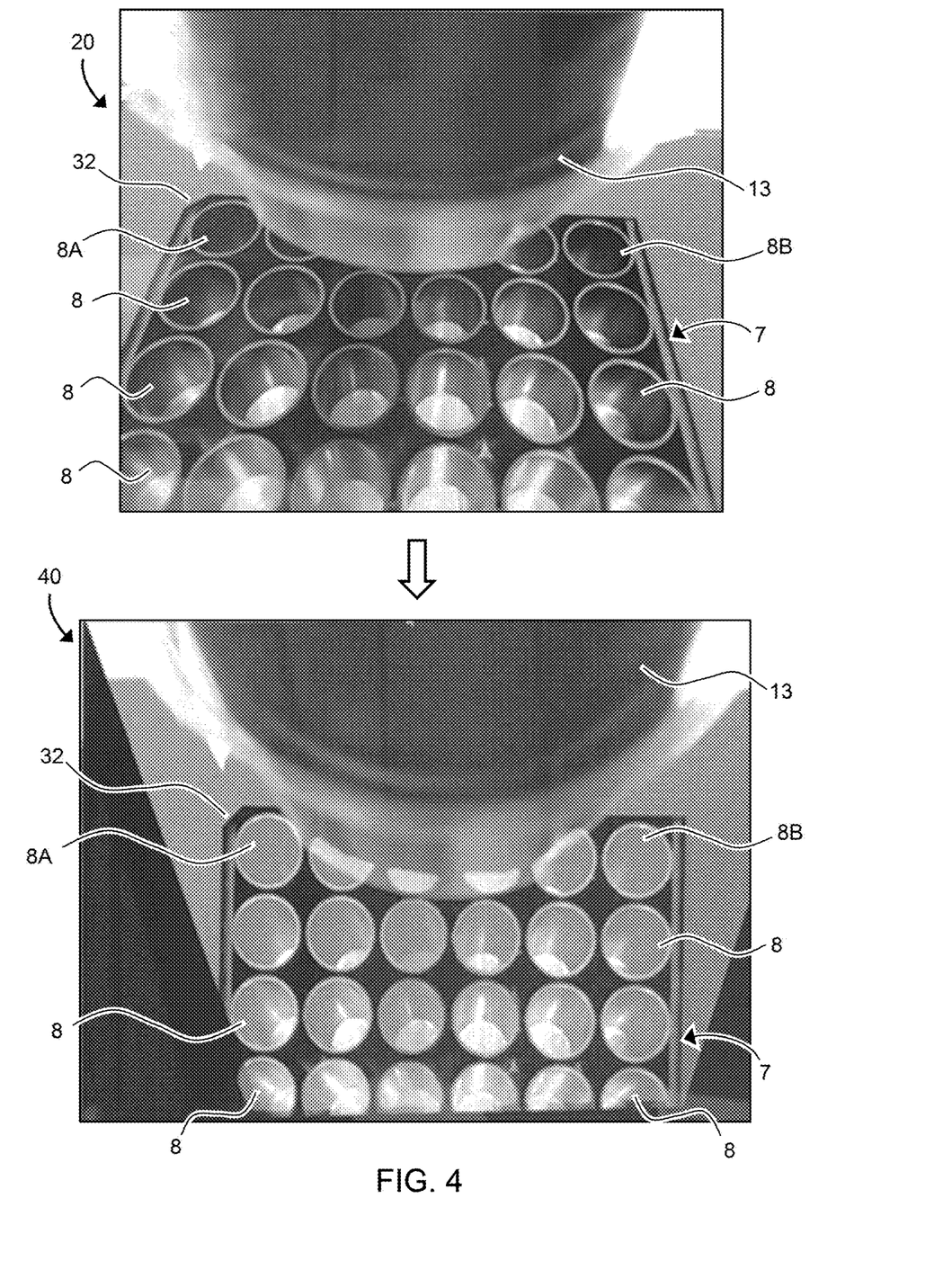
FIG. 4 illustrates characteristics of example embodiments of a method according to the invention.

In a variation of the embodiment shown, the image processing model M2 is trained as an end-to-end model. Instead of receiving an image region 25 as input, the end-to-end model receives the entire overview image 20 in order to calculate the orientation indication O from the same. FIG. 4

FIG. 4 shows by way of example an actual captured overview image 20. This image depicts a sample carrier 7 with a plurality of sample receptacles 8, namely a multi-well plate with a plurality of sample wells. A condenser 13 of the microscope is also visible. The sample carrier 7 has a beveled corner as a orientational feature 32 while other corners of the sample carrier form a 90° angle.

A processed overview image 40 is calculated from the overview image 20 using image processing. While the overview image 20 shows an oblique view of the sample carrier 7, the processed overview image 40 corresponds to a top view of the sample carrier 7 following an image transformation by means of a homography estimation. A binary mask in which the sample regions 8 are localized has also been created by means of a segmentation; the binary mask is superimposed on the image content, which is visible in the greyscale view of FIG. 4 merely by a brightening of the pixels of the sample regions 8. Detection of the orientational feature 32 occurs in this example based on the processed overview image 40 and optionally while taking the segmented sample regions 8 into account. The latter information is helpful in order to establish the presence and location of a beveled corner of the sample carrier 7 more reliably.

The established location of the orientational feature 32 is used in order to assign an individual identifier to each of the sample regions 8. By means of the identifier, a particular sample region 8 can be distinguished from the other sample regions 8—independently of the orientation of the sample carrier 7 on the microscope stage and thus independently of an orientation of the sample carrier 7 in overview images. For example, a sample region 8A at the beveled corner can also be found in a subsequently captured overview image in cases where the sample carrier 7 is placed in a different orientation so that, for example, a sample region 8B is located uppermost and furthest to the left in the subsequently captured overview image. The identifiers of the sample regions 8 can be exploited, e.g., in order to observe a sequence in which the sample regions 8 are moved by a motorized microscope stage to the optical axis of a microscope objective for more detailed analysis. The sequence can provide, e.g., that the sample region 8A at the beveled corner is always analyzed first before the analysis is continued with the other sample regions in the same row of sample receptacles 8. The identifiers make it possible to observe this sequence regardless of the orientation of the sample carrier 7.

The calculated orientation indication can constitute a classification of the orientation of the sample carrier into one of a plurality of predetermined classes. For example, there can be four classes, which respectively correspond to orientations of a sample carrier rotated by 90° relative to each other. This is appropriate in particular with rectangular or square sample holders with four possible positions on the microscope stage, each rotated by 90° relative to the next. With rectangular sample holders that are not square, it is possible for only two different orientations of the sample holder to be feasible instead of four, in particular due to a receiving frame on the microscope stage. It is thus also possible for a classification of the orientation into one of only two possible classes to occur, wherein the two possible classes correspond to orientations rotated by 180° relative to each other.

The described variant embodiments of the invention increase the reliability with which sample regions of a sample carrier can be clearly identified. The variants described in relation to the different figures can be combined with one another. The described example embodiments are purely illustrative and variations of the same are possible within the scope of the attached claims.

LIST OF REFERENCE SIGNS

1 Microscope
2 Stand
3 Objective revolver
4 (Microscope) objective
5 Illumination device
6 Sample stage/microscope stage
7 Sample carrier
8, 8A, 8B Sample regions (e.g. wells) of a sample carrier 7
9 Microscope camera
9A Overview camera
9B Mirror
9C Field of view of the overview camera
10 Computing device
11 Computer program
12 Eyepiece
13 Condenser
20, 20' Overview image
21 Superimposition of the overview image 20 with determined bounding boxes of image regions 25 containing predetermined structures
25 Image region showing a predetermined structure 30
30 Predetermined structure
31 Sample region designation/sample receptacle designation on the sample carrier 7
32 Orientational feature of the sample carrier 7
33 Column/row marker on the sample carrier 7
35 Orientation estimate for an associated image region 25
36 Identifier assigned to a sample region in the overview image
40, 40' Processed overview image/navigation map
100 Microscopy system
M1 Localization model
M2 Image processing model
O Orientation indication
O1 (Correct) orientation of the sample carrier 7
O2 (Incorrect) orientation of the sample carrier 7, which is rotated by 180° relative to the orientation O1
P1-P5 Processes of a method according to the invention

What is claimed is:

1. A computer-implemented method for determining an orientation of a sample carrier of a microscope, comprising:
receiving, on at least one computing device, an overview image showing at least a part of a sample carrier with a plurality of sample regions;
the at least one computing device evaluating the overview image in order to localize predetermined structures;
the at least one computing device analyzing at least one image region that shows at least one predetermined structure to calculate an orientation indication which is a classification of an orientation of the sample carrier into one of only two possible classes, the classes corresponding to orientations that are rotated by 180° relative to each other.

2. The method according to claim 1, further comprising:
assigning identifiers to localized sample regions as a function of the calculated orientation indication.

3. The method according to claim 1,
wherein the orientation indication states whether there is a correct orientation or an incorrect orientation that is rotated by 180° relative to the correct orientation.

4. The method according to claim 3,
wherein the correct orientation designates an orientation of the sample carrier in which the sample carrier is arranged on a sample stage of the microscope in such a manner that numbers or letters on the sample carrier are not upside down when viewed by a user in front of the microscope, while the incorrect orientation designates an orientation in which numbers or letters on the sample carrier are upside down when viewed by a user in front of the microscope;
or
wherein the correct orientation designates an orientation of the sample carrier in which an orientational feature of the sample carrier is located at an associated orientational feature of a holding frame on the sample stage, while the incorrect orientation designates an orientation in which the orientational feature of the sample carrier is not located at the associated orientational feature of the holding frame on the sample stage.

5. The method according to claim 1, further comprising:
providing localized sample regions in the overview image with identifiers in a first sequence in cases where the orientation indication indicates a correct orientation, while the localized sample regions in the overview image are provided with the identifiers in a second sequence in cases where the orientation indication indicates an incorrect orientation, wherein the second sequence is an inversion of the first sequence.

6. The method according to claim 5, further comprising:
segmenting the overview image in order to localize the sample regions;
generating a navigation map based on the overview image, wherein localized sample regions are marked in the navigation map and are provided with the identifiers;
wherein the sample regions can be selected in the navigation map by a user, whereupon a sample stage of the microscope is moved so that an optical axis of the microscope passes through a selected sample region.

7. The method according to claim 1,
wherein position settings of a sample stage are adjusted as a function of the calculated orientation indication.

8. The method according to claim 1,
wherein the predetermined structures include one or more of the following:
sample region designations;
light reflections on a surface of the sample carrier;
adhesive labels or stamped markings;

shapes of sample carrier sections;
sample receptacles or a lateral offset of sample receptacles.

9. The method according to claim 1,
wherein analyzing at least one image region that shows at least one predetermined structure occurs using a machine-learned image processing model;
wherein the image processing model is learned using training data comprising input data in the form of image regions with predetermined structures for which an orientation indication is respectively specified in the form of a target result.

10. The method according to claim 1, further comprising:
calculating a respective orientation estimate for each of a plurality of image regions which respectively show a predetermined structure, wherein an associated confidence score is established for each orientation estimate;
combining the orientation estimates depending on the associated confidence scores in order to calculate the orientation indication.

11. The method according to claim 1,
wherein the overview image is captured with an overview camera;
wherein, following the localization of a predetermined structure, a sample stage is adjusted so that the predetermined structure is located in a field of view of a microscope camera different from the overview camera;
wherein a microscope image of the localized predetermined structure is captured with the microscope camera;
wherein the microscope image or a section of the microscope image is used as the at least one image region using which the orientation indication is calculated.

12. The method according to claim 1,
wherein at least one of the image processing model and a localization model that evaluates the overview image in order to localize predetermined structures is configured to exploit contextual information,
wherein the contextual information relates to one or more of the following:
a microscope user;
settings or components of the microscope;
a holding frame used to hold the sample carrier;
a model type of the sample carrier;
properties of the sample carrier.

13. The method according to claim 1,
wherein the sample carrier comprises a multiwell plate with a plurality of sample receptacles.

14. A computer-implemented method for determining an orientation of a sample carrier of a microscope, comprising:
receiving an overview image showing at least a part of a sample carrier with a plurality of sample regions;
establishing an orientation of the sample carrier using a learned model that has been trained to process the overview image to calculate an orientation indication which is a classification of an orientation of the sample carrier into one of only two possible classes, the classes corresponding to orientations that are rotated by 180° relative to each other.

15. A microscopy system comprising:
a microscope for image capture; and
at least one computing device configured for:
receiving an overview image showing at least a part of a sample carrier with a plurality of sample regions; and
either: evaluating the overview image in order to localize predetermined structures, and analyzing at least one image region that shows at least one predetermined structure to calculate an orientation indication which is a classification of an orientation of the sample carrier into one of only two possible classes, the classes corresponding to orientations that are rotated by 180° relative to each other;
or: establishing an orientation of the sample carrier using a learned model that has been trained to process the overview image to calculate an orientation indication which is a classification of the orientation of the sample carrier into one of only two possible classes, the classes corresponding to orientations that are rotated by 180° relative to each other.

16. The microscopy system according to claim 15,
wherein the at least one computing device is further configured for assigning identifiers to localized sample regions as a function of the calculated orientation indication.

17. The microscopy system according to claim 15,
wherein the at least one computing device is further configured for providing localized sample regions in the overview image with identifiers in a first sequence in cases where the orientation indication indicates a correct orientation, while the localized sample regions in the overview image are provided with the identifiers in a second sequence in cases where the orientation indication indicates an incorrect orientation, wherein the second sequence is an inversion of the first sequence.

18. The microscopy system according to claim 15,
wherein the at least one computing device is further configured for adjusting position settings of a sample stage as a function of the calculated orientation indication.

19. The microscopy system according to claim 15,
wherein the at least one computing device is further configured for:
calculating a respective orientation estimate for each of a plurality of image regions which respectively show a predetermined structure, wherein an associated confidence score is established for each orientation estimate;
combining the orientation estimates depending on the associated confidence scores in order to calculate the orientation indication.

20. A non-transitory computer-readable medium including a computer program comprising commands which, when the program is executed by a computer, cause the execution of the method according to claim 1.

* * * * *